United States Patent [19]

Yamamoto et al.

[11] Patent Number: 5,046,802
[45] Date of Patent: Sep. 10, 1991

[54] LIGHT WAVELENGTH CONVERTER

[75] Inventors: Osamu Yamamoto; Toshihiko Yoshida, both of Nara, Japan

[73] Assignee: Sharp Kabushiki Kaisha, Japan

[21] Appl. No.: 498,573

[22] Filed: Mar. 26, 1990

[30] Foreign Application Priority Data

Mar. 28, 1989 [JP] Japan .................................. 1-77823

[51] Int. Cl.$^5$ .......................... H03F 7/00; G02B 6/10
[52] U.S. Cl. ..................................... 359/328; 372/22; 359/332; 385/122; 385/130
[58] Field of Search .......................... 350/96.11–96.14; 372/22; 307/425, 426

[56] References Cited

U.S. PATENT DOCUMENTS

| 4,739,507 | 4/1988 | Byer et al. ............................. 372/22 |
| 4,763,019 | 8/1988 | Duguay et al. ............. 350/96.12 X |
| 4,852,961 | 8/1989 | Yamamoto et al. ............. 350/96.19 |
| 4,925,263 | 5/1990 | Sanford et al. ................. 307/425 X |
| 4,930,132 | 5/1990 | Shimizu et al. ....................... 372/22 |

FOREIGN PATENT DOCUMENTS 1-108533  4/1989  Japan .
1-194487  4/1989  Japan .

OTHER PUBLICATIONS

W. J. Kozlovsky et al, IEEE Journal Quantum Electronics, vol. 24, No. 6, Jun. 1988, pp. 913–919.

Primary Examiner—Akm Ullah
Attorney, Agent, or Firm—Nixon & Vanderhye

[57] ABSTRACT

A light wavelength converter comprising a substrate that is made of a material with a non-linear optical effect, and a loop-shaped optical waveguide that is formed on the substrate, whereby a second harmonic wave or a sum wave emanates from a fundamental wave that has been propagated in a specific area of the optical waveguide and part of the fundamental wave that has not been converted to the second harmonic wave or the sum wave is returned to the specific area of the optical waveguide, so that a fundamental wave with a relatively low output can be efficiently converted to a second harmonic wave and a high-output second harmonic wave can be obtained.

8 Claims, 2 Drawing Sheets

LIGHT WAVELENGTH CONVERTER

BACKGROUND OF THE INVENTION

1. Field of the Invention

The present invention relates to a light wavelength converter, which is used in an information processor, such as an optical memory disc system or a laser beam printer, and an optical application measuring apparatus using laser beams emitted from a semiconductor laser device when the wavelength of the laser beams is converted into a short wavelength zone.

2. Description of the Prior Art

For an information processor, such as an optical memory disc system or a laser beam printer, and an optical application measuring apparatus, the laser beam of a semiconductor laser device that is easily condensed and superior in directivity is used. In general, the oscillation wavelength of semiconductor laser devices is 780 nm or 830 nm, the laser beam being near infrared. In recent years, in order to increase the amount of information to be processed in an information processor, or to improve the measurement accuracy of the optical application measuring apparatus, the laser beam has been promoted to be of a short wavelength. For example, in an information processor, such as an optical memory disc system or a laser beam printer, the laser beam emitted from the semiconductor laser device is condensed at a predetermined place so as to write the information or images. The wavelength of the laser beam and the diameter of the focusing spot usually have therebetween a proportional relationship, so that, when the wavelength of a laser beam becomes short, the diameter of the focusing spot can be reduced. When the diameter thereof is reduced, the amount of information (i.e., the recording density) to be written into the optical memory disc system can be increased. Moreover, the laser beam printer can form micro-images when the wavelength of the laser beam is shortened, so that the recording density can be increased and the resolution can be improved. Furthermore, if green or blue laser beams with shorter wavelengths could be easily obtained, they could be combined with the red laser beams currently in use to realize high-speed, high-resolution color printers. In optical application measuring apparatuses, the measuring precision can be improved by shortening the wavelength of the laser beam.

In recent years, laser beams with oscillation wavelengths in the 600-nm range (680 nm) have been obtained with semiconductor laser devices using group III—V semiconductor materials, but further shortening of the wavelength with group III—V semiconductor materials is difficult. Semiconductor laser devices using ZnSe, ZnS and other group II—VI semiconductor materials are being studied, but p-n junctions have not yet been realized. Therefore, semiconductor laser devices capable of oscillating shortwave green and blue laser beams have not yet been realized because suitable materials have not yet been discovered. For this reason, green, blue and other shortwave laser beams are currently obtained only with argon ion laser and other large gas lasers.

In order to obtain green and blue shortwave laser beams without using large gas lasers, light wavelength converters have been proposed which yield laser beams with half the wavelength of laser beams oscillated by solid-state lasers and semiconductor laser devices. The light wavelength converters utilize non-linear optical phenomena typified by second harmonic generating (SHG) using crystals with a non-linear optical effect, whereby a laser beam is output with a wavelength one half that of the input fundamental wave.

A conventional light wavelength converter has, as shown in FIG. 3, a channel optical waveguide 32 formed on a $LiNbO_3$ crystalline substrate 31 by a proton-exchange technique. The $LiNbO_3$ crystalline substrate 31 has a large non-linear optical constant, so a second harmonic wave 34 of the half-wavelength of the wavelength of the fundamental wave 33 incident on the optical waveguide 32 is generated by the SHG phenomenon. This second harmonic wave 34 emanates from the optical waveguide 32 into the $LiNbO_3$ crystalline substrate 31 at an angle $\theta$ which is phase-matched with the fundamental wave 33, and it is then emitted from the end of the substrate 31.

By means of this converter, the generation of a green 0.53-$\mu$m laser beam has been observed using a YAG laser with an oscillation wavelength of 1.06 $\mu$m. Moreover, by optically coupling a laser beam emitted from a semiconductor laser device, which has an oscillation wavelength of 0.84 $\mu$m and an optical output of 80 mW, with one end of the optical waveguide at 40 mW by means of an optical system including lenses and prisms, a blue laser beam with a wavelength of 0.42 $\mu$m and an optical output of 0.4 mW has been observed. In the case of a laser beam with a fundamental wave of multiple oscillation wavelengths (oscillation in a longitudinal mode), a sum wave (sum of optical frequencies of two fundamental waves) is generated. Below, second harmonic waves also refer to sum waves.

It is known that the output of a second harmonic wave generated in this way is proportional to the square of the output of the input fundamental wave. Therefore, in order to obtain a blue laser beam with a practical output of 5 mW using the above-mentioned light wavelength converter, it is necessary to input a fundamental wave with an output of approximately 140 mW into the optical waveguide 32 and propagate it there. Considering the coupling efficiency of the fundamental wave with the optical waveguide, a semiconductor laser device with an output of approximately 280 mW is required. However, the output of high-output semiconductor laser devices is only around 50~100 mW at the present time. Moreover, due to the low coupling efficiency thereof with the optical waveguide, it is difficult to obtain a blue laser beam with a practical output of 5 mW.

SUMMARY OF THE INVENTION

The light wavelength converter of this invention, which overcomes the above-discussed and numerous other disadvantages and deficiencies of the prior art, comprises a substrate that is made of a material with a non-linear optical effect, and a loop-shaped optical waveguide that is formed on said substrate, whereby a second harmonic wave or a sum wave emanates from a fundamental wave that has been propagated in a specific area of said optical waveguide and part of said fundamental wave that has not been converted to said second harmonic wave or said sum wave is returned to said specific area of said optical waveguide.

In one embodiment, the specific area of said optical waveguide that functions to convert said fundamental wave to a second harmonic wave or a sum wave is a second harmonic wave generating part that is positioned linearly on said substrate along the length of said substrate.

In a preferred embodiment, one end of said second harmonic wave generating part continues to one end of said substrate so that said end of said second harmonic wave generating part is flush with said end of said substrate, said fundamental wave being introduced into said optical waveguide via said end of said second harmonic wave generating part.

In a preferred embodiment, an optical grating coupler is disposed on said optical waveguide so that said fundamental wave can be introduced into said optical waveguide by means of said optical grating coupler.

In a preferred embodiment, the optical wavelength converter further comprises a refractive index control means that is positioned in the vicinity of a part of the remaining area of said optical waveguide, said refractive index control means functioning to change the refractive index of said remaining area of said optical waveguide, thereby adjusting the phase of said fundamental wave, which is returned to said specific area of said optical waveguide, so as to satisfy resonance conditions of said fundamental wave.

In a preferred embodiment, the refractive index control means is a pair of refractive index control electrodes that are positioned on either side of part of the remaining area of said optical waveguide.

Thus, the invention described herein makes possible the objective of providing a light wavelength converter that is capable of efficiently converting a fundamental wave with a relatively low output to a second harmonic wave, thereby generating a high-output second harmonic wave.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
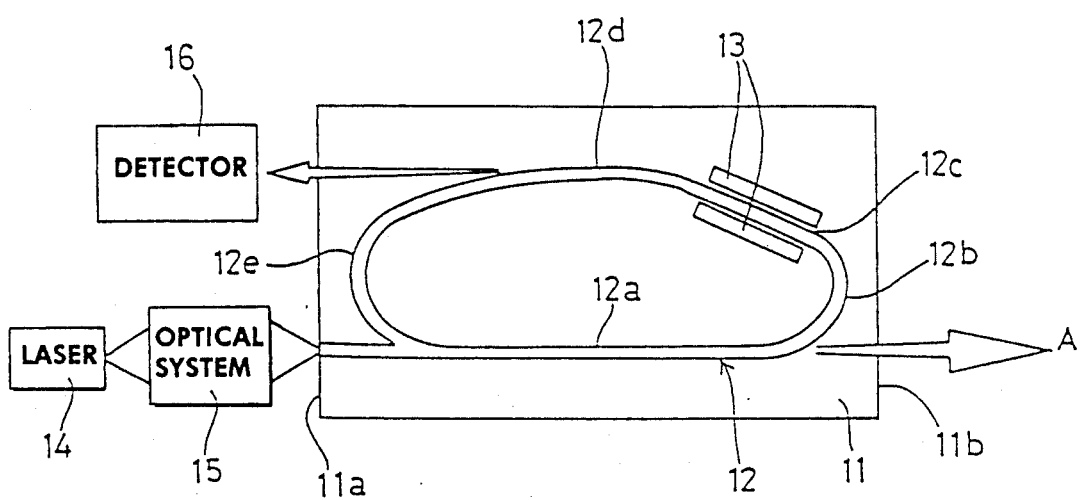
FIG. 1 is a plan view showing a light wavelength converter of the present invention.
Figure 2:
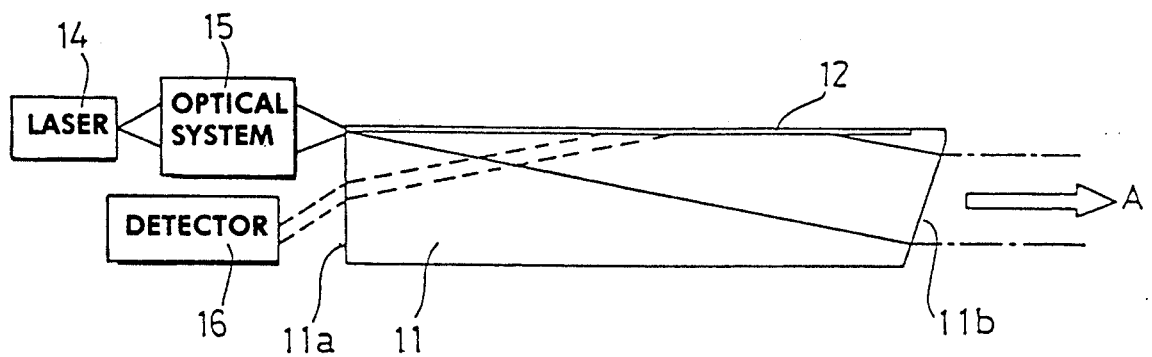
FIG. 2 is a side view showing the light wavelength converter of FIG. 1.
Figure 3:
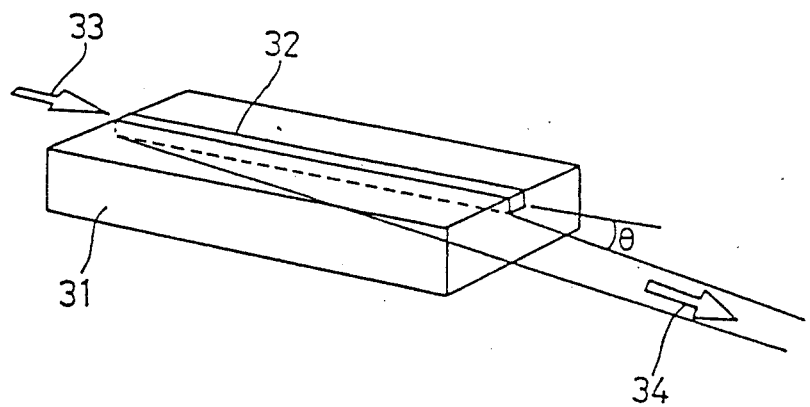
FIG. 3 is a perspective view showing a conventional light wavelength converter.

FIGS. 1 and 2 show a light wavelength converter of this invention, which comprises a crystalline substrate 11 made of a material with a non-linear optical effect on which a loop optical waveguide 12 is formed. For example, Y-cut MgO-doped $LiNbO_3$ can be used as the material for the crystalline substrate 11.

The optical waveguide 12 has a second harmonic wave generating part 12a positioned linearly on the substrate 11 along the length of the substrate 11, and one end of the second harmonic wave generating part 12a continues to one end 11a of the substrate 11 so that the end of the second harmonic wave generating part 12a is flush with the end 11a of the substrate 11. The fundamental wave is introduced into the optical waveguide 12 from the said end 11a. The opposite end of the second harmonic wave generating part 12a comes near the opposite end of the substrate 11 where it is linked to one end of a first semi-circular curved part 12b. The other end of the first curved part 12b is linked to one end of a linear inclined part 12c which is inclined at a small angle with respect to the above-mentioned second harmonic wave generating part 12a. On the substrate 11, is positioned a refractive index control means such as a pair of refractive index control electrodes 13 on either side of said inclined part 12c. The other end of the inclined part 12c is linked to one end of a linear monitor wave generating part 12d, which is parallel to the above-mentioned second harmonic wave generating part 12a. The monitor wave generating part 12d is positioned across from about the middle of the second harmonic wave generating part 12a, and its other end is linked to one end of a second curved part 12e. The second curved part 12e gradually curves toward the second harmonic wave generating part 12a as it comes near the end 11a of the substrate 11 where the end of the second harmonic wave generating part 12a is positioned, and the other end of the second curved part 12e is linked to the end of the second harmonic wave generating part 12a linked to the end 11a of the substrate 11, so the optical waveguide 12 is a loop except for this end of the second harmonic wave generating part 12a.

An optical waveguide 12 with this configuration is formed as described below. First of all, molybdenum or tantalum is deposited on the Y-plate $LiNbO_3$ crystalline substrate 11 by electron beam deposition, and then a resist is applied thereto, after which the above-mentioned pattern of the optical waveguide 12 is formed by a laser beam drawing technique, and a metal mask is formed with a 2-$\mu$m-wide loop slit in the prescribed shape. It is then subjected to a proton-exchange treatment in 230° C. phosphoric acid, and the metal mask is removed, resulting in optical waveguide 12 of the prescribed loop shape.

An optical system 15 is positioned opposite one side of the end 11a of the substrate 11 where the end of the optical waveguide 12 is positioned. A laser beam emitted from the laser beam source 14 is irradiated on the end of the optical waveguide 12 in the substrate 11 via the optical system 15. Moreover, a detector 16 is positioned opposite the same end 11a of the substrate 11 which the optical system 15 faces. The detector 16 is positioned slightly lower than the line extending from the monitor wave generating part 12d in the optical waveguide 12. The other end 11b opposite one end 11a of the substrate 11 which the optical system 15, etc., faces gradually inclines toward the end 11a of the substrate 11 from the upper side of the substrate 11 to the bottom side thereof.

In the light wavelength converter of this configuration, the laser beam emitted from the laser beam source 14 is introduced as a fundamental wave into the optical waveguide 12 of the substrate 11 via the optical system 15. The fundamental wave introduced into the optical waveguide 12 is propagated in a TE mode within the second harmonic wave generating part 12a of the optical waveguide 12 since the substrate 11 is made from Y-cut $LiNbO_3$ material. At this time, the fundamental wave is converted to a second harmonic wave which emanates into the substrate 11 since the second harmonic wave generating part 12a was formed using $d_{33}$, whereby the non-linear optical constant of the $LiNbO_3$ substrate 11 is maximized. The second harmonic wave which has emanated into the substrate 11 is propagated along a downward slope in the substrate 11 in the direction of the second harmonic wave generating part 12a of the optical waveguide 12 and is emitted from the inclined end 11b of the substrate 11 as indicated by the arrow A in FIGS. 1 and 2. Since the end 11b from which the second harmonic wave is emitted inclines toward the opposite end 11a from which the laser beam is introduced, the second harmonic wave which propagates downward in the substrate 11 is emitted from the end 11b of the substrate 11 in the direction that is parallel to the upper surface of the substrate 11.

The fundamental wave that has not been converted to a second harmonic wave from the second harmonic wave generating part 12a of the optical waveguide 12 is directed into the first curved part 12b from the said second harmonic wave generating part 12a, and it passes from the said first curved part 12b through the inclined part 12c, the monitor wave generating part 12d and the second curved part 12e back to the second harmonic wave generating part 12a. In the said second harmonic wave generating part 12a, part of the fundamental wave is converted to a second harmonic wave together with a new fundamental wave introduced to the second harmonic wave generating part 12a while it propagates through the second harmonic wave generating part 12a, and this emanates into the substrate 11. The fundamental wave propagated in the second harmonic wave generating part 12a of the optical waveguide 12 in this manner comprises both newly introduced fundamental wave and returned fundamental wave, so that the light density of the fundamental wave in the optical waveguide 12 is increased and the fundamental wave introduced into the optical waveguide 12 can be converted to a second harmonic wave with high efficiency.

The refractive index of an area including the first curved part 12b, inclined part 12c, monitor wave generating part 12d and the second curved part 12e of the optical waveguide 12, which return to the second harmonic wave generating part 12a the fundamental wave that was not converted to a second harmonic wave by the second harmonic wave generating part 12a of the optical waveguide 12, is changed by a voltage impressed from the pair of refractive index control electrodes 13 positioned on either side of the inclined part 12c, so that the phase of the fundamental wave can be adjusted to satisfy resonance conditions of the fundamental wave.

The fundamental wave that is not converted to a second harmonic wave in the second harmonic wave generating part 12a of the optical waveguide 12 and is returned to the second harmonic wave generating part 12a emanates a second harmonic wave into the substrate 11 in the monitor wave generating part 12d while it propagates through the said monitor wave generating part 12d. The second harmonic wave emanated from the monitor wave generating part 12d is emitted from the end of the substrate 11 toward the detector 16. The detector 16 captures information about the second harmonic wave emitted from the monitor wave generating part 12d, and based on this information, the second harmonic wave information emitted from the second harmonic wave generating part 12a of the optical waveguide 12 is monitored. The length of the monitor wave generating part 12d should be made as short as possible to prevent degradation of the conversion efficiency of the second harmonic wave emitted from the second harmonic wave generating part 12a by the second harmonic wave emitted from the monitor wave generating part 12d.

In the light wavelength converter of this invention, a semiconductor laser device with a 40-mW output as the laser beam source 14 was used and the length of the second harmonic wave generating part 12a of the optical waveguide 12 was 5 mm, whereby a second harmonic wave with a 5 mW output was obtained.

In the above-mentioned example, an optical waveguide 12 that was formed by a proton-exchange technique on a Y-cut MgO-doped $LiNbO_3$ crystalline substrate 11 was used, but it is not limited thereto; e.g., an optical waveguide formed on a Y-cut $LiNbO_3$ substrate by a proton-exchange technique using benzoic acid containing lithium benzoate can be employed, or an optical waveguide formed on a Z-cut $LiNbO_3$ substrate can be used to propagate the fundamental wave in the TM mode. Moreover, the loop-shaped waveguide path can be any shape as long as the waveguide loss is small and it returns the fundamental wave back to the second harmonic wave generating part. In addition, KTP (potassium titanyl phosphate), $LiTaO_3$, organic non-linear optical materials or the like can be used for the substrate. Further, the fundamental wave is not limited to semiconductor laser beams emitted from semiconductor laser devices, and laser beams emitted from solid-state lasers such as YAG lasers, etc., can be used. There is, of course, no restriction on the wavelength of the laser beam emitted from the semiconductor laser device.

The fundamental wave can also be introduced into the optical waveguide via an optical grating coupler instead of from the end of the optical waveguide.

As mentioned above, the light wavelength converter of the present invention has a loop-shaped optical waveguide, and the fundamental wave that has not been converted to a second harmonic wave while it propagates through the optical waveguide is returned so that it can be converted to a second harmonic wave, whereby the fundamental wave introduced into the optical waveguide can be converted with high efficiency to a second harmonic wave, resulting in a second harmonic wave with high output.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A light wavelength converter comprising:
   a substrate that is made of a material with a non-linear optical effect and
   a loop-shaped optical waveguide that is formed on said substrate,
   wherein said loop-shaped optical waveguide has a second harmonic wave generating part in which a second harmonic wave emanates from a fundamental wave that has been propagated and a circulating part for returning a fundamental wave which is not converted into a second harmonic wave to said second harmonic wave generating part.

2. A light wavelength converter according to claim 1, wherein said second harmonic wave generating part is positioned linearly on said substrate along the length of said substrate.

3. A light wavelength converter according to claim 2, wherein one end of said second harmonic wave generating part continues to one end of said substrate so that said end of said second harmonic wave generating part is flush with said end of said substrate, said fundamental wave being introduced into said optical waveguide via said end of said second harmonic wave generating part.

4. A light wavelength converter according to claim 2, wherein an optical grating coupler is disposed on said optical waveguide so that said fundamental wave is introduced into said optical waveguide by means of said optical grating coupler.

5. A light wavelength converter according to claim 1, which further comprises a refractive index control means that is positioned in the vicinity of a part of said circulating part, said refractive index control means functioning to change the refractive index of said circulating part, thereby adjusting the phase of said fundamental wave which is returned to said second harmonic wave generating part so as to satisfy resonance conditions of said fundamental wave.

6. A light wavelength converter according to claim 5, wherein said refractive index control means comprises a pair of refractive index control electrodes that are positioned on either side of part of the remaining area of said optical waveguide.

7. A light wavelength converter comprising:

a substrate that is made of a material with a non-linear optical effect, and a loop-shaped optical waveguide that is formed on said substrate, wherein said loop-shaped optical waveguide has a sum wave generating part in which a sum wave emanates from a fundamental wave that has been propagated and a circulating part for returning a fundamental wave, which is not converted into a sum wave, to said sum wave generating part.

8. A method for converting the wavelength of input optical signals, said method comprising:

passing input optical signals of a first wavelength along an optical waveguide segment formed on a substrate having non-linear optical properties whereby a portion of said input optical signals re converted to output optical signals of different second wavelength, and recirculating unconverted optical signals of said first wavelength back into said optical waveguide segment together with said input optical signals thereby increasing the overall efficiency of converting optical signals from said first wavelength to said second wavelength.

* * * * *